United States Patent Office 2,880,413
Patented Mar. 31, 1959

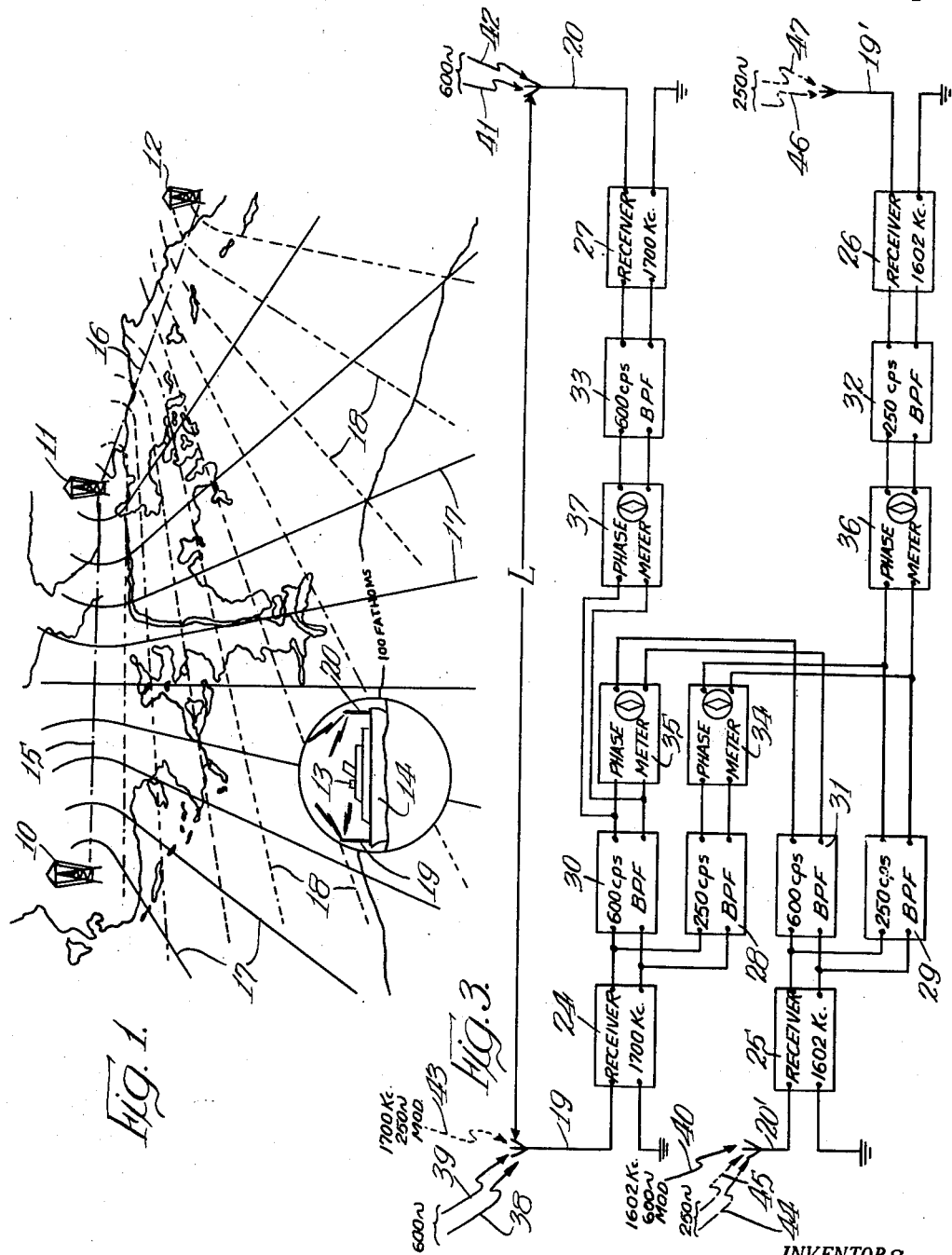

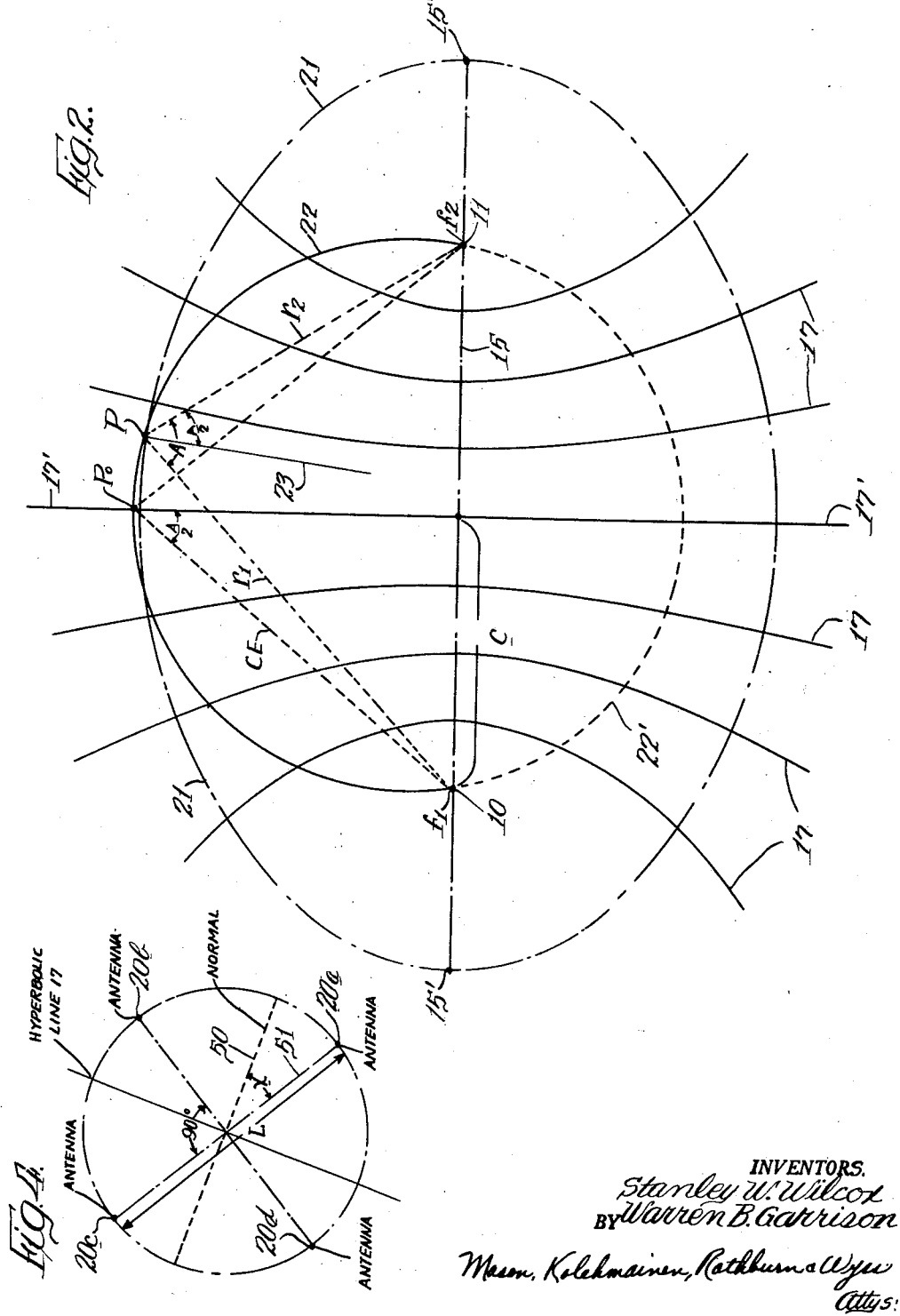

2,880,413

METHODS AND APPARATUS FOR DETERMINING POSITION

Stanley W. Wilcox and Warren B. Garrison, Tulsa, Okla., assignors to Seismograph Service Corporation, Tulsa, Okla., a corporation of Delaware Application August 28, 1953, Serial No. 377,094

24 Claims. (Cl. 343—105)

The present invention relates to radio position finding systems and more particularly to methods and apparatus for use in radio position finding systems employing phase comparison in pairs of position indication signals radiated from a plurality of spaced transmitting points to provide indications from which the position of a mobile receiving point relative to the known positions of the transmitting points may be determined.

In systems of the particular type referred to, the continuous waves radiated from each pair of transmitters produce standing waves in space, the phase relationship of which changes as a function of changing position between the two transmitting points. More specifically, the standing waves produced by each pair of transmitting units of the system are characterized by isophase lines which are hyperbolic in contour about the transmitting points as foci. On a line connecting the pair of transmitters, these isophase lines are spaced apart a distance equal to one-half the mean wave length of the radiated waves and have diverging spacings at points on either side of this line. With this system arrangement, the position of a receiving point relative to a pair of hyperbolic isophase lines may be determined by measuring the phase relationship between continuous waves radiated from the pair of transmitters.

Since the point of location of the receiving point along the zone separating the two isophase lines is not indicated by such a phase measurement, it becomes necessary to employ at least three spaced transmitters, different pairs of which function to provide a grid-like pattern of intersecting hyperbolic lines, in order to obtain absolute determination of the position of the receiving point. Systems of the character described are exceedingly accurate insofar as the position indications produced at the receiving point are concerned. To obtain the desired indication accuracy, however, it is necessary to maintain phase synchronization between the continuous waves radiated by the spaced transmitters, or alternatively, so to arrange the system that phase shifts between the radiated waves are compensated during the phase comparing operation.

In Honore Patent No. 2,148,267 a system is disclosed in which the carrier waves of each pair of transmitters are heterodyned at a fixed link transmitting point, and the difference frequency component of the heterodyned waves is modulated as a reference signal upon the carrier output of the link transmitter for radiation to the receiving point, where the difference frequency component is detected and phase compared with a difference frequency signal derived by directly heterodyning the transmitted continuous waves at the receiving point. In this manner, phase shifts between the continuous waves radiated from the two transmitters are completely compensated so that the measured phase angle is truly representative of the location of the receiving point between a pair of isophase lines. In Hawkins and Finn U. S. Patent 2,513,317 an improved system is disclosed wherein a pair of transmitters are alternately operated as link transmitters and as position signal transmitters thereby reducing the number of signal channels required. It is desirable that the channel frequencies employed be located adjacent the broadcast band or at least below the ultra-high frequency band in order to obviate the problem of line-of-sight transmission, which of course necessitates the location of a number of channel frequencies in the most crowded portion of the frequency spectrum, at least insofar as operations in the United States are concerned. Since frequency allocations in this band must be maintained at a minimum, it is highly desirable to provide a position determining system which reduces the number of channels required.

Another problem encountered in the operation of continuous wave systems is that of eliminating ambiguity from the phase measurements which provide the desired position information. Thus while the two phase measurements identify the position of the receiving station relative to two intersecting pairs of hyperbolic isophase lines, they do not indicate the particular pairs of lines to which the indications are related. This means that in operating the system the geographic location of the receiving system must be known at the start of movement of the receiving system relative to the transmitting stations and, furthermore, that the successive wave lengths must be counted as the receiving station is moved relative to the grid-like pattern of hyperbolic lines. It also means that a mobile craft entering the radiation pattern of the transmitters cannot utilize the radiated signals to determine its position without employing auxiliary equipment to determine the approximate position of the craft relative to the signal transmitters.

In a copending application Serial No. 138,235, filed January 12, 1950, entitled Radio Location System, now U. S. Patent No. 2,652,558, granted September 15, 1953, and assigned to the same assignee as the present invention, there is disclosed an improved radio location system of the continuous wave type which is free not only of phase synchronization difficulties but also of ambiguity problems. In the system of the said copending application, position indications are obtained having different sensitivities, termed phase sensitivities, insofar as the spacing of the isophase lines is concerned. More specifically, a plurality of low phase sensitivity position indications and a plurality of high phase sensitivity position indications are obtained, the low phase sensitivity indications being effective to locate the range of the high phase sensitivity indications and being characterized by widely spaced phase coincidences and the high phase sensitivity indications being characterized by closely spaced phase coincidences. The high and low phase sensitivity indications are obtained by producing pairs of beat frequency signals in accordance with the principles of the Honore system and then heterodyning these beat frequency signals to produce position indicating and reference signals for phase comparison which have phase sensitivities determined by phantom frequencies corresponding to the sum of or difference between the mean frequencies of the carrier waves from which the pairs of beat frequency signals were derived.

While this latter system completely sovles the ambiguity problem, a considerable number of transmitters and carrier channels are required and a number of narrow band pass filters must be employed to separate the various position indicating and reference signals, which adds to the expense and may cause phase shift difficulties unless the band pass filters are carefully selected and balanced. In United States Patent 2,629,091 entitled Radio Location System, issued February 17, 1953, there is disclosed and claimed an improved radio location system of the continuous wave type which is free of phase synchronization difficulties of the character mentioned, in which the above mentioned disadvantages pertaining to ambiguity are entirely obviated, and in which the use of narrow band pass filters is minimized or eliminated.

However, all of the proposed systems for resolving ambiguity have involved the use of at least one additional channel frequency as well as additional equipment at either or both of the transmitting and receiving ends of the systems. In accordance with the present invention a completely non-ambiguous position determining system is provided without utilizing an additional frequency channel and without altering the transmitting equipment. It is an object of the present invention, therefore, to provide an improved radio location system of the above indicated type in which disadvantages pertaining to ambiguity are entirely obviated.

It is a further object of the present invention to provide an improved radio location system of the continuous wave type in which the above mentioned difficulties in providing ambiguity resolution are eliminated and which at the same time combines economy of channel frequencies with minimum cost of the equipment.

It is another object of the invention to provide an improved radio location system of the continuous wave type which affords a solution to the ambiguity problem without employing an additional channel frequency and without altering the transmitting equipment for establishing an accurate fix.

It is a still further object of the present invention to provide improved receiving equipment for use in radio location systems of the above-indicated character.

It is likewise an object of the present invention to provide a method for determining the approximate location of a mobile unit positioned within a hyperbolic field pattern.

It is still another object of the invention to provide a method for determining the approximate position of a mobile unit in a continuous wave field pattern which includes the step of measuring the rate of divergence of the hyperbolic lines at the unknown position.

The invention both as to its organization and method of operation, together with further objects and advantages thereof will best be understood by reference to the specification, taken in conjunction with the accompanying drawings in which:

Fig. 1 is a pictorial representation of a water-covered area over which survey operations are to be performed illustrating one positional arrangement of the transmitters embodied in the system and the grid-like pattern of isophase lines effectively produced in space by the signals radiated by the transmitters;

Fig. 2 diagrammatically illustrates one pair of the transmitters shown in Fig. 1 with the hyperbolic isophase lines existing therebetween and includes a plurality of curves defined by movement of the mobile receiving unit in predetermined relationship with respect to the hyperbolic lines;

Fig. 3 is a diagrammatic illustration of one form of mobile receiving equipment that may be employed in the system of Fig. 1; and Fig. 4 diagrammatically illustrates one positional arrangement of the antennas at the mobile receiving unit which may be employed in the practice of the present invention.

Referring now to Fig. 1 of the drawings, the invention is illustrated as embodied in a three-foci hyperbolic continuous wave system which is preferably of the type disclosed and claimed in the above-identified Hawkins and Finn Patent No. 2,513,317, but which may be of any other type well-known in the art for providing position information at a mobile receiving unit 13 carried by a vessel or vehicle 14 operating within the radius of transmission of a plurality of spaced transmitting units 10, 11 and 12. These transmitting units are preferably spaced apart approximately equal distances and are so positioned that the base line 15 joining the points of location of the units 10 and 11 is angularly related to the base line 16 joining the points of location of the units 11 and 12. The purpose of the transmitting units 10, 11 and 12 is to radiate position indicating signals in the form of carrier waves which effectively produce within the survey area an intersecting pattern of hyperbolic lines, as indicated by the reference characters 17 and 18, the family of hyperbolas indicated by the numeral 17 being produced as a result of carrier wave radiation by the transmitting units 10 and 11 and the hyperbolic lines designated 18 resulting from carrier wave radiation by the units 11 and 12. Both of the families of hyperbolas 17 and 18 are characterized by isophase lines that are spaced relatively close together on the base lines 15 and 16 interconnecting the transmitting units and that diverge on either side of these base lines. The divergence of the hyperbolas constituting the grid-like pattern is a function of the distance from the base lines joining the units. In accordance with the present invention measurement of the expansion of the hyperbolic lines at any point in the radiation pattern of the transmitting units 10, 11 and 12 provides a coarse position determination which identifies the particular lane between adjacent isophase lines within which the receiving unit 13 is located. An accurate fix of the position of the mobile unit within this lane may be attained by the use of conventional receiving and indicating equipment, such as that described and claimed in the above-identified Patent 2,513,317.

Referring now to Fig. 2, which illustrates a single pair of transmitting units 10 and 11 and the family of hyperbolic lines 17 having foci at the units, let it be assumed that the mobile receiving unit 13 is positioned at any point P within the radius of transmission of the signals radiated by the transmitters at the units 10 and 11. Assume also that the carrier waves radiated by the transmitters at the units 10 and 11 are either phase synchonized by any suitable phase synchronizing system or, alternatively, a reference transmitter is employed in accordance with the principles enunciated in the above identified Honore patent in order to obviate phase synchronization difficulties. The isophase lines 17 are spaced apart on the base line 15 by a phase difference of 360 electrical degrees and by a distance corresponding to one-half wave length of the mean frequency between the carrier waves radiated by the transmitters at the units 10 and 11.

Consider first a single receiving antenna at the receiving unit 13 employed to measure the phase of signals received at difference locations in the hyperbolic pattern established by the transmitting units. The relationship between the phase of two signals received at two different locations may be expressed as:

$$\frac{\Delta \phi_P}{\Delta L} = \frac{\phi_1 - \phi_2}{\Delta L} \qquad (1A)$$

where $\phi_1$ designates the phase of the signal received at a first point $P_1$; $\phi_2$ is representative of the phase of the signal received at a second point $P_2$; $\Delta L$ represents the distance between the two receiving points; and $$\frac{\Delta \phi_P}{\Delta L}$$

is the average rate of change of phase in the direction determined by the alignment of points $P_1$ and $P_2$ with respect to the hyperbolic field. In hyperbolic systems employing phase measurements at two spaced receiving points in which the phase difference between the received signals is obtained, the resulting indication is actually representative of the average change of phase between the two receiving points. The limit of the phase difference, $\phi_1 - \phi_2$, as $\Delta L$ approaches zero, or as the two receiving points are moved very close together, is the rate of change of phase in a given direction. Manifestly two such receiving points may be constituted by a pair of antennas spaced apart at any desired distance aboard the vessel 14 thus controlling the magnitude of the quantity ΔL in Equation 1A.

If the mobile vessel or vehicle 14 is provided with a pair of antennas spaced apart at a fixed distance L, the phase difference between the signals from the transmitters at the units 10 and 11 received at each of these antennas will be dependent upon the alignment of the antennas with respect to transmitting units 10 and 11 and also upon the position of the vessel 14 in the field pattern, i.e., upon the divergence of the hyperbolas effectively provided in space. More particularly, if two spaced antennas designated by the reference characters 19 and 20 in Fig. 1 and positioned at opposite ends of the vessel or vehicle 14, are aligned along the base line 15 (Fig. 2), the phase difference, $\phi_p$, in degrees between the signals received at the two antennas may be expressed as:

$$\phi_P = \frac{L}{\lambda/2} \cdot 360° \qquad (1)$$

in which L is the spacing between antennas in appropriate units of measurement and $\lambda/2$ is the half wave length of the mean frequency of the carrier waves radiated by the units 10 and 11 expressed in the same units of measurement.

Thus if the antennas are spaced apart a quarter wave length, a phase difference of 180° exists between the signals received by these antennas when aligned along the base line 15. If the antennas are positioned equidistant from the base line 15 so that the line interconnecting them is perpendicular to the base line, the signals received by the antennas are in phase since the waves from the respective transmitters of the units 10 and 11 travel equal distances to the antennas. Obviously then the phase difference of the received signals is dependent upon the alignment of the antennas with respect to the hyperbolic lines 17 as well as the distance of the vessel 14 from the base line 15.

When the mobile receiving unit 13 is positioned at point P as shown in Fig. 2, the phase difference between signals received by the two spaced antennas varies from a maximum when the line joining the antennas is perpendicular to the hyperbolic line along which the receiving unit is located to a minimum when the line joining the two antennas is approximately coincident with that particular hyperbola.

The maximum phase difference between the signals received at the two antennas occurs when the line joining them is perpendicular to the hyperbolic curve. Thus, if the receiving unit is moved from point P along a path defined by the ellipse designated by the reference character 21 in Fig. 2, a maximum phase difference between signals received at the two antennas will be maintained. The elliptical path thus traversed is termed the ellipse orthogonal to the hyperbola passing through the point P. The magnitude of this maximum phase difference is not a constant when the unit follows the elliptical path but instead varies from zero on the base line extensions 15' to a maximum along the degenerate hyperbola 17' bisecting the base line 15.

If the phase difference is maintained constant as the mobile receiving unit moves from the point P, the path followed by the unit will be a circle 22 defined by the point P and the points of location of the two transmitting units 10 and 11, the circle passing through the three named points and being designated as a constant expansion circle. The constant expansion circle may thus be defined as the locus of a point moving at constant speed so as to cross the hyperbolic lines produced in space between the units 10 and 11 at an equal rate, thereby following a path at which the expansion factor of the hyperbolas is constant. In accordance with the present invention, measurement of the phase difference existing between signals received at the spaced receiving points provides a means for ascertaining the particular expansion circle along which the mobile receiving unit is positioned.

The expansion factor, which is a measure of the rate of divergence of the hyperbolas, may be defined as the ratio of the lane width at any point P in the survey area to the lane width along the base line and in equation form may be expressed as:

$$E = \frac{LW_P}{\lambda/2} \qquad (2)$$

where E is the expansion factor; $LW_P$ is the lane width at point P; and $\lambda/2$ is the line width along the base line. The lane width at any point is the distance which must be traversed at right angles to the hyperbola in order to effect a complete 360° phase change in the signals received by one of the antennas at the mobile receiving unit. More generally, using two spaced antennas for receiving the radiated waves, the expansion factor may be expressed by the ratio of the maximum phase difference between received signals at the base line, i.e., when the antennas are aligned along the base line, to the maximum phase difference between the signals received by the antennas at any point P, i.e., when the line joining the antennas is perpendicular to the hyperbola through P. Mathematically this relationship may be expressed as:

$$E = \frac{\phi_B}{\phi_P} \qquad (3)$$

in which E is the expansion factor, and $\phi_B$ and $\phi_P$ are the phase differences existing between receiving points spaced apart a fixed distance L along the base line and in space, respectively. From equation (1) this may be reduced to:

$$E = \left(\frac{L}{\lambda/2} \cdot 360\right)\left(\frac{1}{\phi_P}\right) \text{ since } \phi_B = \frac{L}{\lambda/2} \cdot 360 \qquad (4)$$

Since L may be determined by measurement of the linear distance between antennas and $\lambda$ may be ascertained from the known transmitting frequencies of the transmitters at the units 10 and 11, a measurement of the phase difference at point P in order to measure $\phi_P$ provides sufficient information to enable the above equation to be solved for E, the expansion factor. Both L and $\lambda$ will remain a constant for any given installation having transmitting units operating at constant frequency and with antennas at the vessel or vehicle 14 spaced a fixed distance apart and, therefore, the Equation 4 becomes:

$$E = \frac{k}{\phi_P}$$

for any particular system. Thus, it becomes apparent that a solution for the expansion factor may be readily effected by merely spacing two antennas apart and measuring the maximum phase difference between signals radiated from the transmitting units 10 and 11.

To permit the constant expansion circle to be constructed after the expansion factor E has been computed, it should be appreciated from Equation 2 that the expression for the lane width at any point P is:

$$LW_P = \frac{\lambda}{2 \sin \frac{A}{2}} \qquad (5)$$

in which $$E = \frac{1}{\sin A/2}$$

and A represents the angle included between the lines $r_1$ and $r_2$ interconnecting the point P with the foci of the hyperbolas $f_1$ and $f_2$ positioned respectively at the points of location of the transmitting units 10 and 11. The angle A remains constant irrespective of the position along the constant expansion circle 22 occupied by the mobile receiving unit inasmuch as the lines $r_1$ and $r_2$ encompass the same arc portion as illustrated by the dotted line portion 22' of the extended constant expansion circle. The tangent 23 to the hyperbola passing through the point P bisects the angle A and thus divides this angle into two equal portions having a magnitude of A/2 which manifestly also remains constant as the point P moves along the circular path 22. Since A/2 is a constant for any point on the constant expansion circle, the expansion factor E is also a constant for any point on this curve.

The relationship between the expansion factor E and the angle A/2 at the point $P_0$, defined by the intersection of the constant expansion circle 22 and the degenerate hyperbola 17' bisecting the base line 15, enables the construction of the constant expansion circle from the value of E ascertained by measuring the phase difference $\phi_p$ at the position occupied by the mobile receiver. At the point $P_0$ it is apparent that:

$$\sin A/2 = \frac{C}{f_1 P_0} \quad (6)$$

in which C represents one-half of the base line length between the transmitting units 10 and 11 located at foci $f_1$ and $f_2$, respectively, and $f_1 P_0$ represents the distance from foci $f_1$ to the point $P_0$ on the degenerate hyperbola. From Equation 5 in which $$E = \frac{1}{\sin A/2}$$

it can be seen that:

$$\sin \frac{A}{2} = \frac{1}{E} = \frac{C}{f_1 P_0}$$

and thus:

$$f_1 P_0 = CE$$

The value of the expansion factor having been determined as indicated above by measuring the phase difference $\phi_p$ between signals received at the antennas and the value of C being a measurable quantity which is a constant for any particular set of transmitting units, it is possible to calculate the value of CE. On a hyperbolic chart displaying the position of the isophase lines 17 in their geographic relationship to the known positions of the transmitting units 10 and 11 a compass may be positioned at the location of either of the transmitting units and an arc may be struck having a radius equal to CE. The intersection of the arc struck as just described with the degenerate hyperbola 17' locates the point $P_0$ and thus establishes three points on the constant expansion circle 22. The center of the constant expansion circle may be located by drawing the perpendicular bisector to the chord of the circle $f_1 P_0$ which bisector will intersect the degenerate hyperbola 17', the perpendicular bisector of a second chord constituted by the base line 15, at the center of the circle. Having established the center of the circle, a compass may be employed to draw the complete constant expansion circle 22 through the points $f_1$, $f_2$ and $P_0$. It, therefore, becomes apparent that the measurement of the phase difference between the signals received at spaced positions together with a knowledge of the dimensions and frequencies of operation of the transmitting system provide sufficient information to establish the particular expansion circle along which the mobile receiving unit is located.

The position information thus derived is ambiguous in the sense that the measurement of the phase difference at the two antennas between position indicating signals radiated by the transmitters at the units 10 and 11 does not define the particular position on the expansion circle at which the mobile unit is located. Identification of this position is accomplished by measuring the maximum phase difference received at the two spaced receiving points from carrier waves radiated by the transmitting units 11 and 12. By measuring the latter phase difference a second expansion circle passing through the points of location of the transmitting units 11 and 12 and through the point P at which the receiving unit is located may be constructed in the manner indicated above. The intersection of the two constant expansion circles determines the location of the point P in space with an accuracy dependent upon the accuracy of the measurement of the phase differences at the mobile receiving unit. Since this accuracy is somewhat limited due to the small phase differences which exist between antennas spaced relatively close together on board a ship or the like, the position determination is only an approximation of the location of the mobile receiving unit. The exact location may be determined as indicated above by directly comparing the carrier waves radiated by the transmitting units 10, 11 and 12 in a manner well known in the art. The approximation derived from constructing the expansion circles, however, enables a determination of the lane within which the receiving unit is positioned and, therefore, resolves the ambiguity inherent in the accurate phase measurements.

The accuracy of the coarse phase difference measurements may be increased by increasing the distance between the spaced antennas thereby providing a larger phase difference between the signals received or by increasing the base line length or spacing between transmitting units in order to decrease the rate of divergence of the hyperbolas. The maximum spacing between antennas, particularly for shipboard installations, is limited by the size of the vessel or vehicle 14 carrying the mobile receiving equipment and, therefore, the only practical method of improving the accuracy of the coarse phase measurements is to increase the base line length. Since the maximum phase difference between signals appearing at the two antennas varies from a maximum at the base line to zero at an infinite distance from the base line, it is apparent that the alteration of the base line length to decrease the rate of divergence of the hyperbolas does not actually increase the accuracy of the phase difference readings at the receiving unit but in effect causes the phase difference to approach zero value at a slower rate. Thus the increased base line length increases the accuracy of the phase difference readings at a given distance from the base line thereby increasing the area within which these phase difference readings are sufficiently accurate to locate the receiving unit within one of the lanes of the isophase lines produced by carrier wave radiation from the spaced transmitting units.

One type of mobile receiving equipment which may be employed to measure the phase difference between signals received at the pairs of spaced antennas 19 and 20, and 19' and 20' in order to provide coarse position measurements and which may also be employed to provide indications representative of the fine or accurate phase position of the vessel 14 is illustrated in Fig. 3 as comprising a plurality of fixed tuned receivers 24, 25, 26 and 27, a plurality of band pass filters 28, 29, 30, 31, 32 and 33, and a plurality of phase meters 34, 35, 36 and 37. This receiving equipment is adapted to receive the position indicating signals and the reference signals radiated by the transmitting units 10, 11 and 12 which, as indicated above, may be of the type described in Hawkins and Finn Patent 2,513,317 and which may be rendered operative to radiate carrier signals at the frequencies specified in that patent.

As therein described, the transmitting units 10 and 12 are continuously operating to radiate carrier waves of different frequency which may be intermittently modulated with reference signals during appropriate spaced intervals of operation, whereas the unit 11 is adapted to radiate alternately a pair of position indicating signals in the form of carrier waves of different frequencies during the spaced intervals. The receiving equipment for providing the fine or accurate phase indications, is of the type described in Patent 2,513,317 and in Fig. 3 is represented by the component elements of the block diagram drawn in solid lines. The equipment which has been added to the receiving unit described in the indicated patent in accordance with the present invention to provide measurements of the phase difference existing between signals received at the spaced antennas is represented by those component elements indicated by the dotted lines in Fig. 3.

When the transmitter at the unit 10 and the transmitter of the unit 11 are operating to radiate position indicating signals at frequencies of 1700.300 and 1699.700 kilocycles, respectively, the transmitter at the unit 12 is operative to radiate a carrier wave at a frequency of 1602.125 kilocycles which is modulated by a reference signal of 600 cycles equal to the difference frequency between the signals radiated by the operating transmitters at the units 10 and 11. The receiver 25 is center tuned to a frequency of 1602.000 kilocycles and thus, as indicated by the solid line arrow 40, receives the modulated carrier wave radiated by the transmitter at the unit 12. The 600 cycle modulation component is reproduced by the receiver 25 and applied through the band pass filter 31 center tuned to a frequency of 600 cycles to the right hand set of input terminals of the phase meter 35. The receiver 24 is center tuned to a frequency of 1700.000 kilocycles and thus, as indicated by solid line arrows 38 and 39, the carrier waves radiated by the operating transmitters at the units 10 and 11 are accepted by this receiver and heterodyned to reproduce the 600 cycle beat frequency signal which is applied through the band pass filter 30 to the left hand set of input terminals of the phase meter 35. This meter is, therefore, energized by signals of identical frequency and the resulting indication of the phase relationship between applied signals is representative of the accurate position of the vessel 14 between adjacent isophase lines spaced relatively close together and effectively produced in space by the carrier waves radiated by the operating transmitters at the units 10 and 11.

The output of the band pass filter 30, a 600 cycle signal resulting from the heterodyning of the position indicated signals radiated by the operating transmitters at the units 10 and 11, is also applied to the left hand set of input terminals of the phase meter 37. During this same interval, as indicated by solid line arrows 41 and 42, the antenna 20, spaced a fixed distance L from the point of reception of the antenna 19 is energized by both of the carrier waves radiated by the transmitters of the units 10 and 11. These carrier waves are heterodyned by the receiver 27 in order to produce a 600 cycle beat frequency signal which is applied through the band pass filter 33 to the right hand set of input terminals of the phase meter 37. The phase meter 37, therefore, functions to measure the phase difference between the heterodyne signals applied to its opposite sets of input terminals. Inasmuch as these signals were produced by carrier waves radiated from the same transmitters at the units 10 and 11, phase shift difficulties are completely obviated and the phase meter 37, therefore, provides an indication which is representative of the difference between signals received at the antennas 19 and 20 due solely to the difference in travel time of the radiated waves between the two reception points.

During the second interval of operation the transmitting unit 11 is rendered operative to radiate a second position indicating signal at a frequency of 1601.875 kilocycles, the transmitter at the unit 10 radiates an unmodulated 1602.125 kilocycle carrier wave and the transmitter at the unit 10 is operative to radiate a 1700.300 kilocycle carrier wave which is modulated by the 250 cycle difference frequency between the signals radiated by the operating transmitters at the units 11 and 12. The modulated carrier wave radiated by the unit 10 as indicated by the dotted line arrow 43 is received by the receiver 24 and the 250 cycle modulation component developed at the output terminals of this receiver is applied through the band pass filter 28 to the left hand set of terminals of the phase meter 34. The position indicating signals radiated by the operating transmitters at the units 11 and 12 during this interval are received as indicated by the dotted line arrows 44 and 45 at the antenna 20' positioned closely adjacent to the antenna 20 and at the fixed distance L from the antenna 19. The two carrier waves appearing at this antenna are heterodyned by the receiver 25 in order to produce a 250 cycle beat frequency signal which is applied through the band pass filter 29 to the right hand set of input terminals of the phase meter 34 where it is phase compared with the reference signal applied to the opposite set of input terminals. The resulting indication on this phase meter is accurately representative of the position of the vessel 14 between adjacent isophase lines effectively produced in space by the carrier waves radiated by the operating transmitters at the units 11 and 12 during the second interval of operation.

The 250 cycle heterodyne signal passed by the band pass filter 29 is also applied to the left hand set of input terminals of the phase meter 36. During this same interval, as indicated by dotted line arrows 46 and 47, the antenna 19', positioned closely adjacent the antenna 19 and at a fixed distance L from the antenna 20, is energized by the carrier waves radiated by the operating transmitters at the units 11 and 12. These two carrier waves are heterodyned by the receiver 26 in order to reproduce a 250 cycle difference frequency signal which is applied through the band pass filter 32 to the right hand set of input terminals of the phase meter 36. Since the signals heterodyned at the antenna 19' and at the antenna 20' both emanated from the carrier waves radiated by the transmitters at the units 11 and 12, any phase shift error in the carrier waves will be transmitted over dual paths thus insuring that the indication on the phase meter 36 accurately portrays the phase difference between signals received at the spaced antennas due solely to the difference in travel time of the carrier waves. It thus becomes apparent that the indications on the phase meters 34 and 35 accurately define the phase position of the vessel 14 between adjacent hyperbolic lines 17 and 18, respectively, of the hyperbolic grid produced in the survey area. Manifestly from the mathematical derivations above, if the phase differences indicated on the meters 36 and 37 were maximized, it would be possible to construct the expansion circles to obtain an approximate position determination of the vessel 14 in order to ascertain between which of the pairs of adjacent isophase lines of the hyperbolic grid the vessel is located. In order to maximize the readings on the phase meters 36 and 37 the aligned pairs of antennas 19 and 20 and 19' and 20' should be positioned approximately perpendicular to the hyperbolic line on which the vessel 14 is located. One method for effecting a maximum reading on these phase meters would be to mount the antennas on a rotating pedestal which could be turned through 360° and to observe the maximum phase readings on the meters 36 and 37 during rotation. Obviously these maximum phase readings would occur at different positions in the rotation of the antennas inasmuch as the maximum phase reading on the meter 36 would result when the antennas were positioned perpendicular to one of the hyperbolas 18 and the maximum phase reading on the phase meter 37 would occur when the antennas were perpendicularly aligned with respect to one of the hyperbolas 17. Generally, however, the use of a rotating pedestal would not be feasible due to the large spacing between antennas ordinarily employed in order to provide phase differences of measurable magnitude. A second method for obtaining the maximum phase differences is to turn the vessel 14 in as sharp a turn as possible to effect a complete 360° rotation of the aligned pairs of antennas. The maximum phase readings on the meters 36 and 37 may be observed as the position of the vessel 14 is altered. Having obtained a reading of the maximum phase difference, Equation 4 may be solved for the expansion factor and from the computed value of E the expansion circles for the pairs of transmitting units may be constructed.

If desired the necessity for orienting each pair of spaced antennas with respect to the hyperbolic lines 17 and 18 may be obviated by employing two mutually perpendicular aligned pairs of equally spaced antennas in an arrangement such as that shown in Fig. 4. The line 17 is representative of one of the hyperbolic lines between the units 10 and 11 along which the vessel 14 is located and the line 50 represents the normal to this hyperbolic line, which is also the position assumed by a single pair of spaced antennas aligned with respect to the line 17 to provide maximum phase difference between signals received thereby.

The four antennas are designated by the reference numerals 20a, 20b, 20c and 20d and are positioned at equally spaced points along the circumference of an imaginary circle having its center at the intersection of the hyperbolic line 17 and the normal 50. The antennas 20a and 20c are separated by a fixed distance L as are the antennas 20b and 20d and each of these pairs of antennas is adapted to be connected to phase difference measuring apparatus which may be of the type previously described and which functions to measure the phase difference between signals received at the spaced pairs of antennas.

If it is assumed that the number of electrical degrees of phase variation on either side of the hyperbolic line 17 varies linearly with distance, i.e., that the hyperbolic lines representative of each degree of phase position are positioned equal distances apart within a limited area such as the span L between antennas, the variation may be expressed in terms of radians per foot and designated R.

The angle X represents the angle between an imaginary line 51 interconnecting the antenna pair 20a and 20c and the normal line 50. Thus if the antennas were aligned so that the line 51 coincided with the normal line 50, the meter reading, designated $M_1$ on the phase measuring apparatus connected between the antennas 20a and 20c would be equal to (LR) radians, i.e., the total antenna span expressed in feet multiplied by the phase variation per foot. The meter reading $M_1$ could obviously be calibrated to read radian measure instead of the conventional measurement of electrical degrees. With antennas 20a and 20c in the position just described it is apparent that the antennas 20b and 20d would both be located practically coincident with the isophase hyperbolic line 17 and, therefore, the meter reading designated $M_2$ of the phase measuring apparatus connected between these antennas would be zero. Obviously, the maximum phase difference between signals received by the pairs of antennas would be equal in magnitude to LR since this is the phase difference encountered when each antenna pair is perpendicularly aligned with respect to the hyperbolic line 17.

When the antennas 20a and 20c occupy any position along the imaginary circle to form the angle X between the line 51 and the line 50, the reading $M_1$ on the phase measuring apparatus connected therebetween is equal to:

$$LR \cos X \quad (7)$$

expressed in radians. The aligned pair of antennas 20b and 20d are disposed at an angle of 90° with respect to the aligned pair 20a and 20c and thus the reading $M_2$ of the phase measuring apparatus connected between the former antenna pair may be expressed as $LR \cos(x+90°)$ in radians. The latter equation reduces by trigonometric substitution to:

$$M_2 = (LR) \sin X \quad (8)$$

From the two Equations 7 and 8:

$$M_1^2 = (LR)^2 \cos^2 X$$

$$M_2^2 = (LR)^2 \sin^2 X$$

and $$M_1^2 + M_2^2 = (LR)^2 (\cos^2 X + \sin^2 X)$$

but by trigonometric identity:

$$\cos^2 X + \sin^2 X = 1$$

and, therefore:

$$LR = \sqrt{M_1^2 + M_2^2}$$

Thus the maximum phase difference occurring between a single pair of spaced antennas is equal to the square root of the sum of the squares of the individual phase differences between each pair of the aligned mutually perpendicular pairs of antennas irrespective of their angular orientation with respect to the hyperbolic pattern. The value of $\sqrt{M_1^2 + M_2^2}$ is of the same magnitude as the phase difference which would be obtained by employing a single pair of antennas spaced apart a distance L and oriented in the hyperbolic field to produce a maximum phase difference. The individual phase readings thus provide information from which the maximum phase difference may be computed without altering the course of the vessel 14 and without stopping the progress of the survey being conducted.

Since the meter readings $M_1$ and $M_2$ are indicative only of the maximum value of the phase difference existing between signals at the vessels radiated by the units 10 and 11 to form the hyperbolic pattern 17, it is necessary to provide additional measuring equipment to provide similar readings for the phase differences existing between signals received at the vessel from the units 11 and 12. This additional equipment may be in the form of a second set of aligned pairs of perpendicular antennas and an additional pair of phase measuring devices connected between the antenna pairs. Alternatively, this equipment may consist of additional phase measuring apparatus connected to the antennas 20a, 20b, 20c and 20d but which includes selective means for differentiating between the signals radiated by the units 10 and 11 and those radiated by the units 11 and 12.

From the above explanation it will be apparent that the present invention affords a satisfactory solution to the problem of resolving ambiguity and at the same time minimizes the number of frequency channels required to form a complete radio position determining system. In addition, the described system provides an economy in the amount of equipment required to form the complete transmitting and receiving apparatus. While the invention has been described in conjunction with radio position determining apparatus of the hyperbolic continuous wave type, it should also be appreciated that other applications will arise, particularly in the field of navigation, in which the relative magnitude of the phase difference existing between pairs of spaced antennas may be employed to indicate the relative position of a mobile unit with respect to a hyperbolic field pattern. For instance, a mobile unit could be maintained on an essentially elliptical course merely by maintaining a maximum phase difference between signals received at a pair of spaced antennas since the indication of a maximum phase difference is representative of the ellipse orthogonal to the hyperbolic curve on which the mobile unit is located. Thus by insuring that each position of the mobile unit represents a maximum phase difference position, it is apparent that the course of the vessel would follow the ellipse orthogonal to all of the hyperbolic lines traversed. This maximum phase difference could be maintained by means of the arrangement shown in Fig. 4 by constantly orienting the position of the mobile unit so that the meter reading on the phase measuring apparatus connected between antennas 20b and 20d is constantly maintained at a zero value thereby insuring that the phase measuring apparatus connected between the antennas 20a and 20c will provide a maximum phase difference indication and also insuring that the course of the vessel carrying the antennas would follow the ellipse orthogonal to the hyperbolic curves forming the field radiation pattern.

While particular embodiments of the invention have been shown, it will be understood, of course, that the invention is not limited thereto since many modifications may be made, and it is therefore contemplated by the appended claims to cover any such modifications as fall within the true spirit and scope of the invention.

What is claimed as new and desired to be secured by Letters Patent of the United States is:

1. A method of resolving ambiguity in radio location systems of the hyperbolic type by determining the approximate location of a mobile unit in a hyperbolic field pattern which comprises measuring the expansion of the hyperbolic lines at the location of the mobile unit, and geometrically constructing the locus of all points of the hyperbolas having an expansion equal to the measured value.

2. A method of resolving ambiguity in radio location systems of the hyperbolic type by determining the approximate location of a mobile unit in a hyperbolic field pattern which comprises measuring the expansion of a first set of hyperbolic lines at the location of the mobile unit to obtain a first measured value, measuring the expansion of an intersecting second set of hyperbolic lines at the same location to obtain a second measured value, constructing a first geometric curve representative of the locus of all points of the first set of hyperbolas having an expansion equal to the first measured value, and constructing a second geometric curve representative of the locus of all points of the second set of hyperbolas having an expansion equal to the second measured value.

3. A method of resolving ambiguity in radio location systems of the hyperbolic type by determining the approximate location of a mobile unit in a hyperbolic field pattern which comprises measuring the expansion of different sets of hyperbolas of said hyperbolic pattern, and constructing from the measured values a pair of constant expansion circles representative of positions along said different sets of hyperbolas at which the same expansion occurs.

4. A method of resolving ambiguity in radio location systems of hyperbolic type by determining the approximate location of a mobile unit in a hyperbolic field pattern which comprises measuring the phase difference between signals appearing at the location of the mobile unit by means including at least one antenna, moving said antenna relative to the field pattern in order to obtain the maximum phase difference thereby providing a measure of the expansion of the hyperbolic lines at said mobile unit, and geometrically constructing the locus of all points in said pattern at which the maximum phase difference is equal to the measured value.

5. A method of resolving ambiguity in radio location systems of the hyperbolic type by determining the approximate location of a mobile unit in a hyperbolic field pattern which comprises measuring the phase differences between pairs of signals appearing at the location of the mobile unit by means including at least one antenna, moving said antenna relative to the field pattern in order to obtain the maximum phase differences between different pairs of said signals thereby providing a measure of the expansions of different sets of hyperbolic lines constituting said pattern, and constructing from the measured values a pair of constant expansion circles representative of positions along each set of said hyperbolic lines at which the same maximum phase difference occurs.

6. A method of resolving ambiguity in radio location systems of the hyperbolic type by determining the approximate location of a mobile unit in a hyperbolic field pattern which comprises measuring the phase difference between a first pair of signals at the location of the mobile unit by means including at least one antenna, measuring the phase difference between a second pair of signals appearing at the mobile unit, moving said antenna relative to the field pattern in order to obtain the maximum phase differences thereby providing measurements of the expansions of the hyperbolic lines at said mobile unit, and constructing from the measured values a pair of constant expansion circles representative of positions along each set of said hyperbolic lines at which the same maximum phase difference occurs.

7. In a position determining system of the hyperbolic type employing a mobile unit positioned at an unknown location with respect to a hyperbolic field pattern, the combination of means for determining an accurate phase indication of the position of said mobile unit within the hyperbolic pattern, and means for measuring the expansion of the hyperbolic lines at the location of the mobile unit to provide an approximate determination of the location of said unit.

8. In a position determining system of the hyperbolic type employing a mobile unit positioned at an unknown location with respect to a hyperbolic field pattern, the combination of means for determining an accurate phase indication of the position of said mobile unit within the hyperbolic pattern, means including a pair of spaced antennas for measuring the phase difference between signals at said mobile unit, and means for maximizing the phase difference measurements to provide an indication of the expansion of the hyperbolic lines at the mobile unit thereby facilitating the determination of the approximate location of the unit.

9. In a position determining system of the hyperbolic type employing a mobile unit positioned at an unknown location with respect to a hyperbolic field pattern, the combination of means for determining an accurate phase indication of the position of said mobile unit within the hyperbolic pattern, and means for measuring the expansions of different sets of hyperbolic lines in the field pattern at the location of the mobile unit to provide an approximate determination of its location.

10. In a position determining system of the hyperbolic type employing a mobile unit positioned at an unknown location with respect to a hyperbolic field pattern, the combination of means for determining an accurate phase indication of the position of said mobile unit within the hyperbolic pattern, means including a pair of spaced antennas for measuring the phase differences between different pairs of signals representative of different sets of hyperbolic lines constituting said pattern, and means for maximizing the phase difference measurements to provide an indication of the expansion of the hyperbolic lines at the mobile unit thereby facilitating the determination of its approximate location.

11. Apparatus for resolving ambiguity in phase comparison systems of the hyperbolic type by determining the approximate location of a mobile receiving unit with respect to sets of intersecting hyperbolic lines established by waves radiated from at least three spaced transmitting units which comprises, spaced receiving means at said mobile unit for measuring different phase positions of said unit with respect to each set of hyperbolic lines, and means for measuring the phase differences between signals received at each of said spaced receiving means in order to provide an indication of the expansions of the different sets of hyperbolic lines of said mobile unit.

12. Apparatus for resolving ambiguity in phase comparison systems of the hyperbolic type by determining the approximate location of a mobile receiving unit with respect to sets of intersecting hyperbolic lines established by waves radiated from at least three spaced transmitting units which comprises, spaced receiving means at said mobile unit for measuring different phase positions of said unit with respect to each set of hyperbolic lines, means for measuring the phase differences between signals received at each of said spaced receiving means, and means for maximizing the phase difference signals by moving the spaced receiving means relative to said hyperbolic lines in order to obtain an indication of the expansions of different sets of hyperbolic lines at said mobile unit.

13. In a position determining system of the hyperbolic type employing a mobile receiving unit positioned within a hyperbolic field pattern, the combination of means for determining an accurate phase position of said mobile unit with respect to different sets of hyperbolic lines of said pattern, and means including spaced receptor points at said mobile receiving unit for measuring the expansion of each of the sets of hyperbolic lines at the location of the mobile unit to provide an approximate determination of its location.

14. In a position determining system of the hyperbolic type employing a mobile receiving unit positioned within a hyperbolic field pattern, the combination of means for determining an accurate phase position of said mobile unit with respect to different sets of hyperbolic lines of said pattern, means including a pair of spaced receptor points for measuring the phase difference between signals received at said spaced receptor points, and means for determining the maximum phase difference between said signals to provide an indication of the divergence of the hyperbolic lines thereby facilitating the determination of the approximate location of said mobile unit.

15. In a position determining system of the hyperbolic type employing a mobile unit positioned at an unknown location with respect to a hyperbolic field pattern, the combination of means for determining an accurate phase indication of the position of said mobile unit within the hyperbolic pattern, and means including angularly disposed pairs of spaced antennas for measuring the expansion of the hyperbolic lines at the location of the mobile unit to provide an approximate determination of the location of said unit.

16. In a position determining system of the hyperbolic type employing a mobile unit positioned at an unknown location with respect to a hyperbolic field pattern, the combination of means for determining an accurate phase indication of the position of said mobile unit within the hyperbolic pattern, means including angularly disposed pairs of spaced antennas for measuring the maximum phase difference between pairs of signals appearing at said antennas to provide an indication of the expansion of the hyperbolic lines at the mobile unit thereby facilitating the determination of the approximate location of the unit.

17. In a position determining system of the hyperbolic type employing a mobile unit positioned at an unknown location with respect to a hyperbolic field pattern, the combination of means for determining an accurate phase indication of the position of said mobile unit within the hyperbolic pattern, and means including at least two aligned pairs of spaced antennas positioned so that one of said aligned pairs is disposed at right angles with respect to the other aligned pair for measuring the maximum phase differences between different pairs of signals received by said antennas and representative of different sets of hyperbolic lines constituting said pattern, thereby providing an indication of the expansion of the hyperbolic lines at the mobile unit in order to facilitate the determination of its approximate location.

18. Apparatus for resolving ambiguity in radio location systems of the hyperbolic type by determining the approximate location of a mobile receiving unit with respect to sets of intersecting hyperbolic lines established by waves radiated from at least three spaced transmitting units which comprises pairs of receptor points angularly disposed with respect to each other spaced at said mobile unit for receiving signals representative of different phase positions of said unit with respect to each set of hyperbolic lines, and means for measuring the phase differences between signals received at each of said spaced receiving means in order to provide an indication of the expansions of the different sets of hyperbolic lines at said mobile unit.

19. Apparatus for resolving ambiguity in radio location systems of the hyperbolic type by determining the approximate location of a mobile receiving unit with respect to sets of intersecting hyperbolic lines established by waves radiated from at least three spaced transmitting units which compriss aligned pairs of angularly disposed spaced receptor points at said mobile unit for receiving signals representative of different phase positions of said unit with respect to each set of hyperbolic lines, means for measuring the phase differences between signals received at each of said aligned pairs of spaced receptor points in order to determine the maximum phase difference between the signals appearing at said mobile unit thereby obtaining an indication of the expansions of different sets of hyperbolic lines at the location of the mobile unit.

20. In a hyperbolic radio location system, apparatus for ascertaining the rate of divergence of the hyperbolic lines at an unknown location established by radiations from spaced transmitting stations which comprises at least two spaced receiving antennas, means for developing first and second control signals each representative of the position of a different one of said antennas with respect to the hyperbolic lines and means jointly responsive to said first and second control signals for indicating the rate of divergence of the hyperbolic lines in the region of said antennas.

21. In a hyperbolic radio location system, apparatus for ascertaining the rate of divergence of the hyperbolic lines at an unknown location by radiation from spaced transmitting stations which comprises at least two spaced receiving antennas, means for indicating the phase difference between signals received at said antennas from said transmitting stations, and means for maximizing the phase difference indications in order to determine the rate of divergence of the hyperbolic lines in the region of said antennas.

22. In a hyperbolic radio location system, apparatus for ascertaining the rate of divergence of the hyperbolic lines at an unknown location which comprises at least two pairs of equally spaced mutually perpendicular receiving antennas, and means for indicating the phase difference between signals received at each pair of antennas.

23. In a hyperbolic radio location system, apparatus for orienting a mobile unit with respect to a hyperbolic field pattern established by spaced transmitters which comprises at least two spaced receiving antennas each of which receives signals radiated from said spaced transmitters, means for developing a first signal representative of the position of a first of said antennas relative to said transmitters, means for developing a second signal representative of the position of the second of said antennas relative to said transmitters, and means jointly responsive to said first and second signals for indicating the divergence of the hyperbolic lines of said pattern at the mobile unit.

24. A method of resolving ambiguity in radio location systems of the hyperbolic type by determining the approximate location of the mobile unit in a hyperbolic field pattern which method comprises the steps of measuring the expansion of the hyperbolic lines at the location of the mobile unit, obtaining a fine position indication representing the position of the mobile unit, and utilizing the expansion measurement to obtain a coarse position determination representing the approximate position of the mobile unit.

References Cited in the file of this patent

UNITED STATES PATENTS

| | | |
|---|---|---|
| 2,531,908 | Grenfell | Nov. 28, 1950 |
| 2,592,459 | Perilhou | Apr. 8, 1952 |
| 2,608,685 | Hastings | Aug. 26, 1952 |
| 2,646,564 | Perilhou | July 21, 1953 |

UNITED STATES PATENT OFFICE
CERTIFICATE OF CORRECTION

Patent No. 2,880,413                                                                       March 31, 1959

Stanley W. Wilcox et al.

It is hereby certified that error appears in the printed specification of the above numbered patent requiring correction and that the said Letters Patent should read as corrected below.

Column 2, line 60, for "sovles" read -- solves --; column 6, line 12, for "line", first occurrence, read -- lane --; column 13, line 46, after "systems of" insert -- the --; column 16, line 8, for "compriss" read -- comprises --.

Signed and sealed this 25th day of August 1959.

(SEAL)
Attest:
KARL H. AXLINE
Attesting Officer

ROBERT C. WATSON
Commissioner of Patents

UNITED STATES PATENT OFFICE

CERTIFICATE OF CORRECTION

Patent No. 2,880,413                                                         March 31, 1959

Stanley W. Wilcox et al.

It is hereby certified that error appears in the printed specification of the above numbered patent requiring correction and that the said Letters Patent should read as corrected below.

Column 2, line 60, for "sovles" read -- solves --; column 6, line 12, for "line", first occurrence, read -- lane --; column 13, line 46, after "systems of" insert -- the --; column 16, line 8, for "compriss" read -- comprises --.

Signed and sealed this 25th day of August 1959.

(SEAL)
Attest:

KARL H. AXLINE
Attesting Officer

ROBERT C. WATSON
Commissioner of Patents